US012224102B2

(12) United States Patent
Kim et al.

(10) Patent No.: US 12,224,102 B2
(45) Date of Patent: Feb. 11, 2025

(54) COIL COMPONENT

(71) Applicant: SAMSUNG ELECTRO-MECHANICS CO., LTD., Suwon-si (KR)

(72) Inventors: Han Kyeol Kim, Suwon-si (KR); Myoung Soon Park, Suwon-si (KR); Sung Hee Kim, Suwon-si (KR); Ji Young Park, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 842 days.

(21) Appl. No.: 17/224,572

(22) Filed: Apr. 7, 2021

(65) Prior Publication Data

US 2022/0181068 A1 Jun. 9, 2022

(30) Foreign Application Priority Data

Dec. 7, 2020 (KR) ........................ 10-2020-0169343

(51) Int. Cl.
*H01F 27/28* (2006.01)
*H01F 17/00* (2006.01)
(Continued)

(52) U.S. Cl.
CPC ..... *H01F 27/2804* (2013.01); *H01F 17/0013* (2013.01); *H01F 27/255* (2013.01);
(Continued)

(58) Field of Classification Search
CPC ............. H01F 27/2804; H01F 17/0013; H01F 27/255; H01F 27/29; H01F 41/041;
(Continued)

(56) References Cited

U.S. PATENT DOCUMENTS

2016/0141093 A1* 5/2016 Jeong ...................... H01F 17/04
336/200
2016/0217917 A1* 7/2016 Jeong .................... H01F 27/292
(Continued)

FOREIGN PATENT DOCUMENTS

KR 10-2018-0073370 A 7/2018
KR 10-2019-0032896 A 3/2019
KR 10-1973437 B1 9/2019

*Primary Examiner* — Shawki S Ismail
*Assistant Examiner* — Kazi S Hossain
(74) *Attorney, Agent, or Firm* — Morgan, Lewis & Bockius LLP

(57) ABSTRACT

A coil component includes: a body; a support substrate disposed in the body; a coil portion including coil patterns, lead patterns, and extension patterns, while disposed on the support substrate, the lead patterns being exposed to the body, and the extension patterns connecting the coil patterns and the lead patterns; and external electrodes disposed on the body and contacting the lead patterns, wherein the lead pattern has an inner portion adjacent to the extension pattern, an outer portion adjacent to the external electrode, and a middle portion disposed between the inner portion and the outer portion, and a width of the middle portion is larger than a width of the inner portion and smaller than a width of the outer portion.

19 Claims, 10 Drawing Sheets

A

(51) Int. Cl.
*H01F 27/255* (2006.01)
*H01F 27/29* (2006.01)
*H01F 41/04* (2006.01)

(52) U.S. Cl.
CPC ........... *H01F 27/29* (2013.01); *H01F 41/041* (2013.01); *H01F 2027/2809* (2013.01)

(58) Field of Classification Search
CPC ....... H01F 2027/2809; H01F 2017/048; H01F 5/04; H01F 17/04; H01F 27/292; H01F 17/0006; H01F 27/28; H01F 27/306; H01F 27/022; H01F 2017/002
USPC .......................................... 336/200, 232, 192
See application file for complete search history.

(56) References Cited

U.S. PATENT DOCUMENTS

2016/0351319 A1* 12/2016 Jeong .................. H01F 17/0033
2018/0182538 A1* 6/2018 Choi ........................ H01F 41/10
2018/0350509 A1 12/2018 Jung et al.
2019/0088406 A1* 3/2019 Kim .................... H01F 27/2804
2020/0051728 A1* 2/2020 Matsumoto ......... H01F 17/0013
2020/0411232 A1* 12/2020 Matsumoto ......... H01F 27/2804

* cited by examiner

COIL COMPONENT

CROSS-REFERENCE TO RELATED APPLICATION(S)

The present application claims the benefit of priority to Korean Patent Application No. 10-2020-0169343, filed on Dec. 7, 2020 in the Korean Intellectual Property Office, the disclosure of which is incorporated herein by reference in its entirety.

TECHNICAL FIELD

The present disclosure relates to a coil component.

BACKGROUND

An inductor, a coil component, is a representative passive electronic component used in an electronic device, together with a resistor and a capacitor.

In accordance with miniaturization and performance improvement of electronic devices, miniaturization and performance improvement of electronic components mounted in the electronic devices have been demanded.

SUMMARY

An aspect of the present disclosure provides a coil component in which a portion of a lead pattern of the coil component has a large size to improve inductance (Ls) characteristics and current characteristics, the portion being coupled to an external electrode.

According to an aspect of the present disclosure, a coil component may include: a body; a support substrate disposed in the body; a coil portion including coil patterns, lead patterns, and extension patterns, while disposed on the support substrate, the lead patterns being exposed to the body, and the extension patterns connecting the coil patterns and the lead patterns; and external electrodes disposed on the body and contacting the lead patterns, wherein the lead pattern has an inner portion adjacent to the extension pattern, an outer portion adjacent to the external electrode, and a middle portion disposed between the inner portion and the outer portion, and a width of the middle portion is larger than a width of the inner portion and smaller than a width of the outer portion.

According to another aspect of the present disclosure, a coil component may include: a body; a support substrate disposed in the body; a coil portion having a through-hole penetrating through a central portion of the coil portion and including a first coil pattern, a first lead pattern, and a first extension pattern, each disposed on a first surface of the support substrate, the first coil pattern winding around the through-hole, the first lead pattern being exposed to outside of the body, the first extension pattern connecting the first coil pattern to the first lead pattern; and a first external electrode disposed on the body and contacting the first lead pattern, wherein a first side surface of the first lead pattern obliquely meets an inner surface of the first external electrode.

According to still another aspect of the present disclosure, a coil component may include: a body; a support substrate disposed in the body; a coil portion having a through-hole penetrating through a central portion of the coil portion and including a coil pattern, a lead pattern, and an extension pattern, each disposed on the support substrate, the coil pattern winding around the through-hole, the lead pattern being exposed to outside of the body, the extension pattern connecting the coil pattern to the lead pattern; and an external electrode disposed on the body and contacting the lead pattern, wherein the extension pattern extends from one end of the coil pattern in an oblique direction with respect to an external surface of the body on which the external electrode is disposed, and the extension pattern includes a portion substantially straight.

BRIEF DESCRIPTION OF DRAWINGS

The above and other aspects, features, and advantages of the present disclosure will be more clearly understood from the following detailed description taken in conjunction with the accompanying drawings, in which.

DETAILED DESCRIPTION

Figure 1:
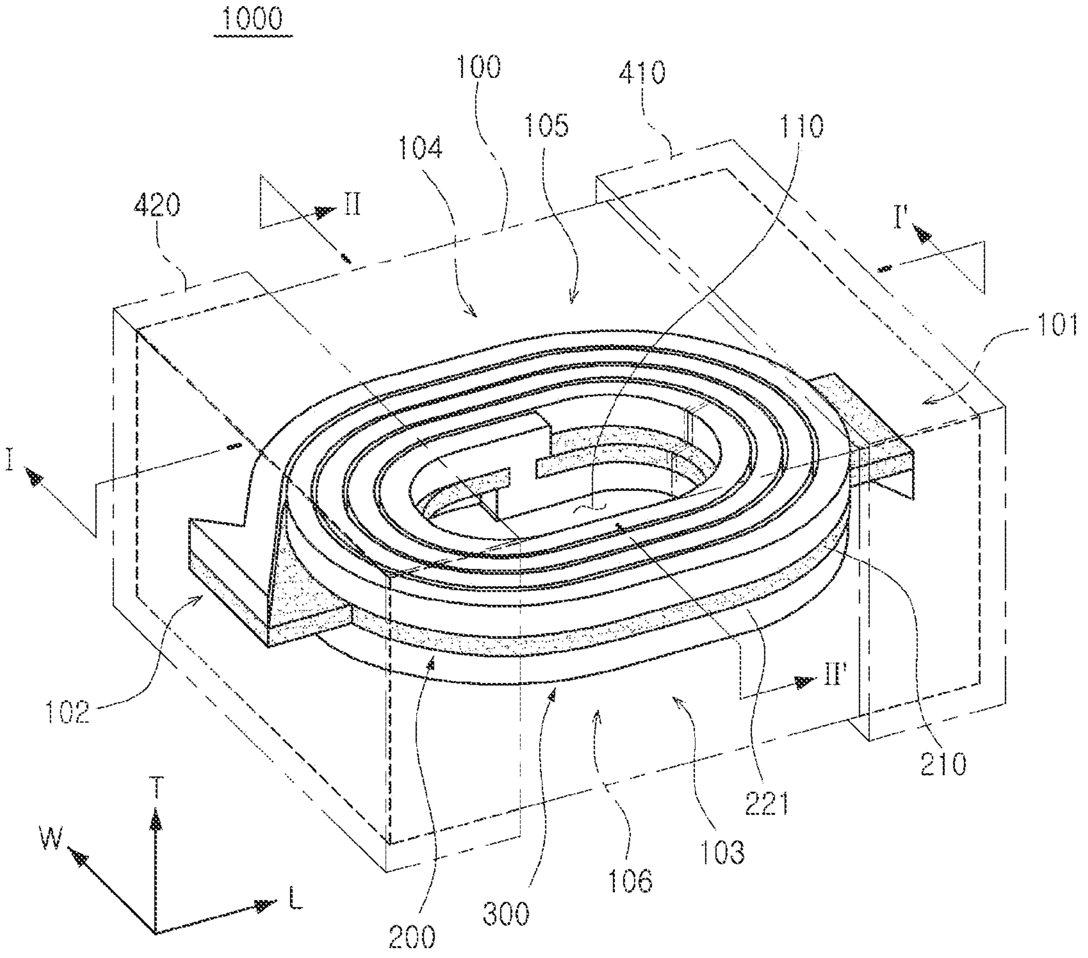
FIG. 1 is a perspective view schematically illustrating a coil component according to an exemplary embodiment in the present disclosure.

In the drawings, an L direction refers to a first direction or a length direction, a W direction refers to a second direction or a width direction, and a T direction refers to a third direction or a thickness direction.

Hereinafter, exemplary embodiments of the present disclosure will now be described in detail with reference to the accompanying drawings.

Various kinds of electronic components may be used in an electronic device, and various kinds of coil components may be appropriately used between these electronic components depending on their purposes in order to remove noise, or the like.

That is, the coil components used in the electronic device may be a power inductor, high frequency (HF) inductors, a general bead, a bead for a high frequency (GHz), a common mode filter, and the like.

FIG. 1 is a perspective view schematically illustrating a coil component according to an exemplary embodiment in the present disclosure.

Figure 2:
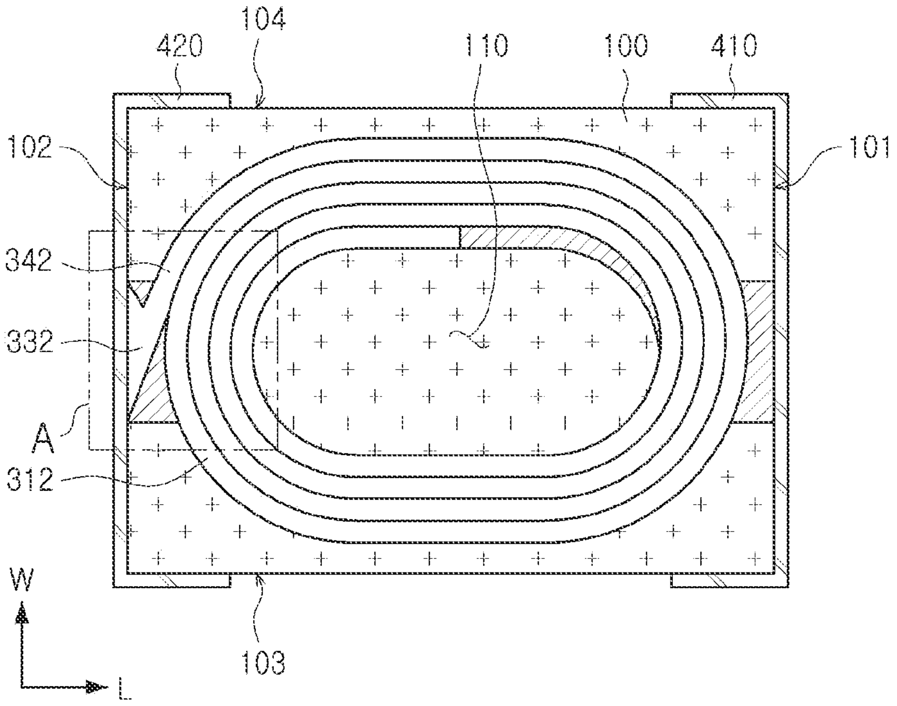
FIG. 2 is a plan view illustrating the coil component according to the exemplary embodiment in the present disclosure.
Figure 3:
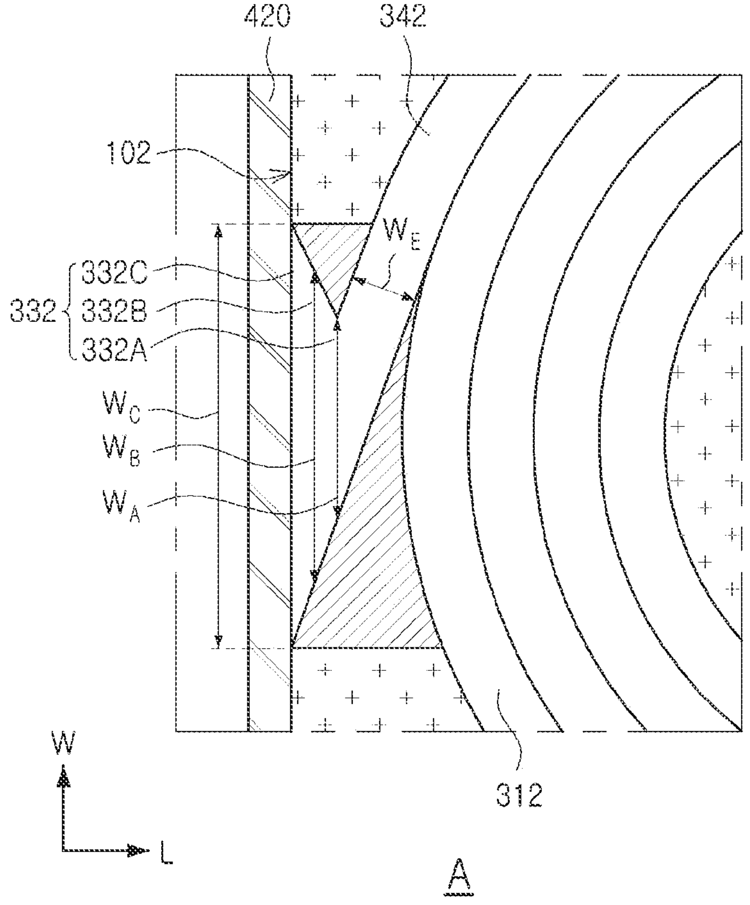
FIG. 3 is an enlarged view of a region A of FIG. 2, illustrating a width of each of an extension pattern and a lead pattern.
Figure 4:
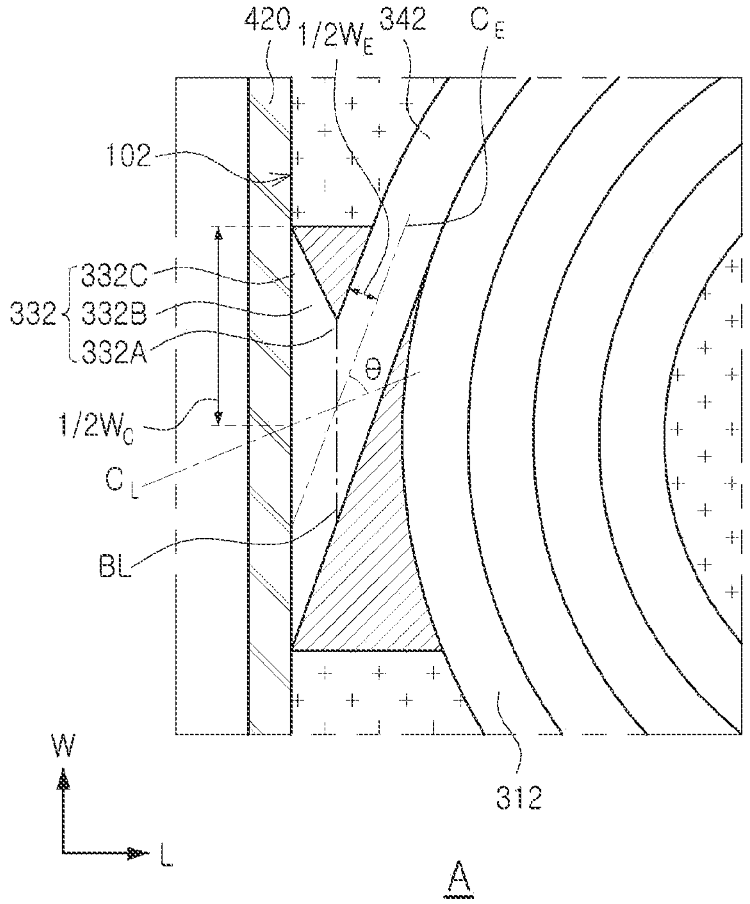
FIG. 4 is an enlarged view of the region A of FIG. 2, illustrating an angle formed by a central line of the extension pattern and a central line of the lead pattern.

FIG. 2 is a plan view illustrating the coil component according to the exemplary embodiment in the present disclosure. FIG. 3 is an enlarged view of a region A of FIG. 2, illustrating a width of each of an extension pattern and a lead pattern. FIG. 4 is an enlarged view of the region A of FIG. 2, illustrating an angle formed by a central line of the extension pattern and a central line of the lead pattern.

Figure 5:
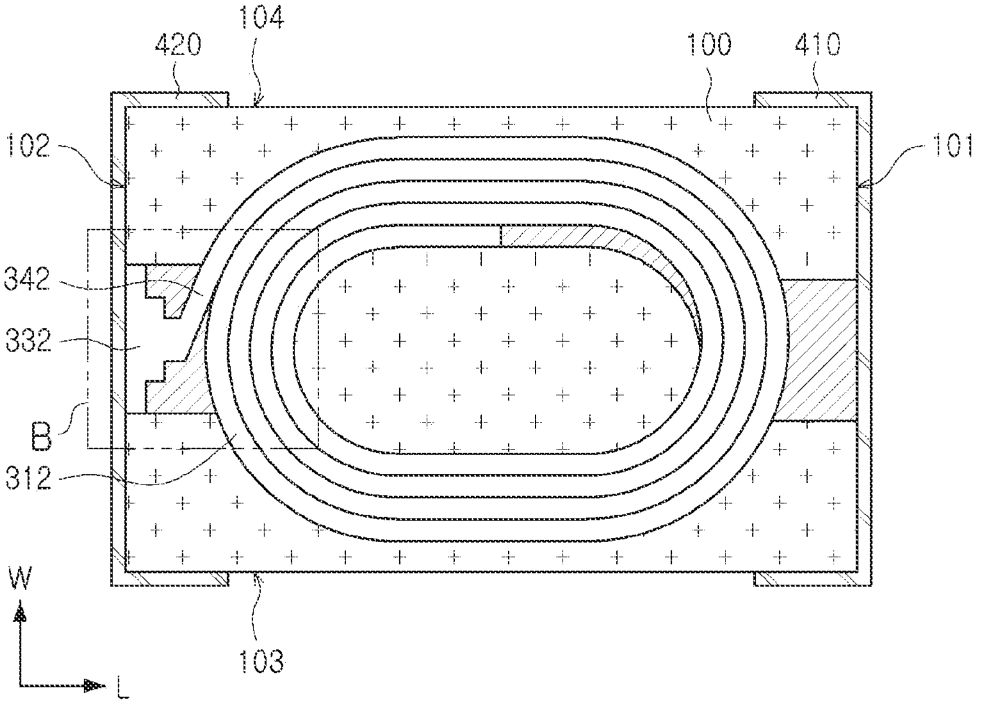
FIG. 5 is a plan view illustrating a coil component according to another exemplary embodiment in the present disclosure.
Figure 6:
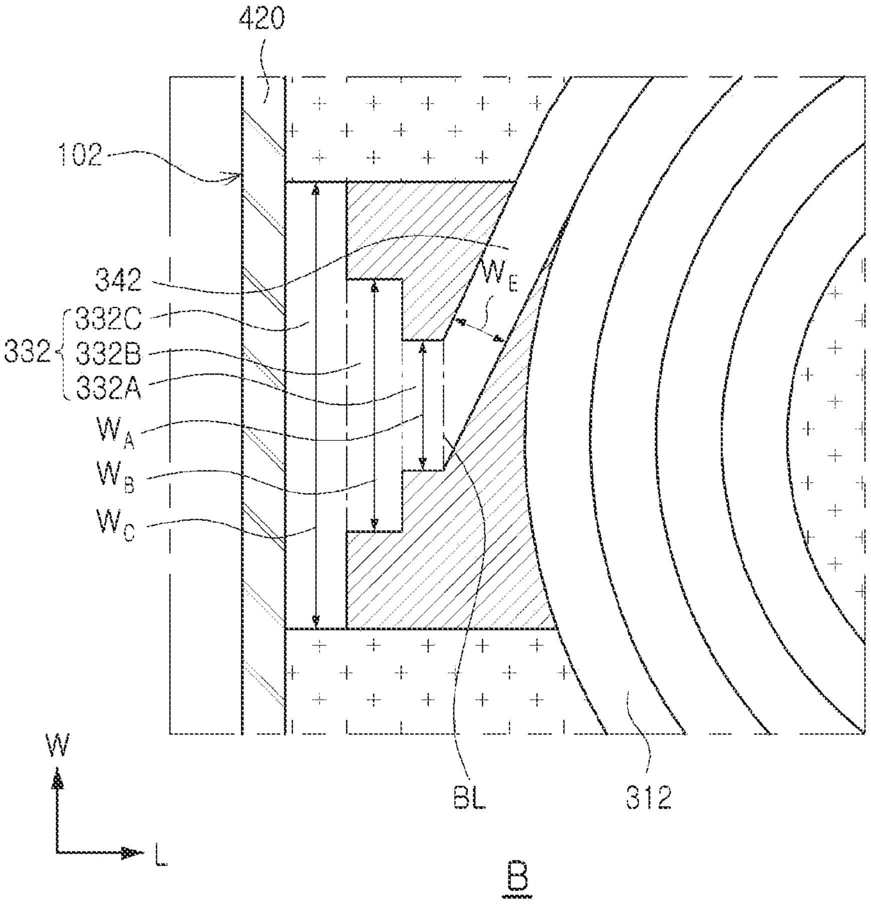
FIG. 6 is an enlarged view of a region B of FIG. 5, illustrating a width of each of an extension pattern and a lead pattern.
Figure 7:
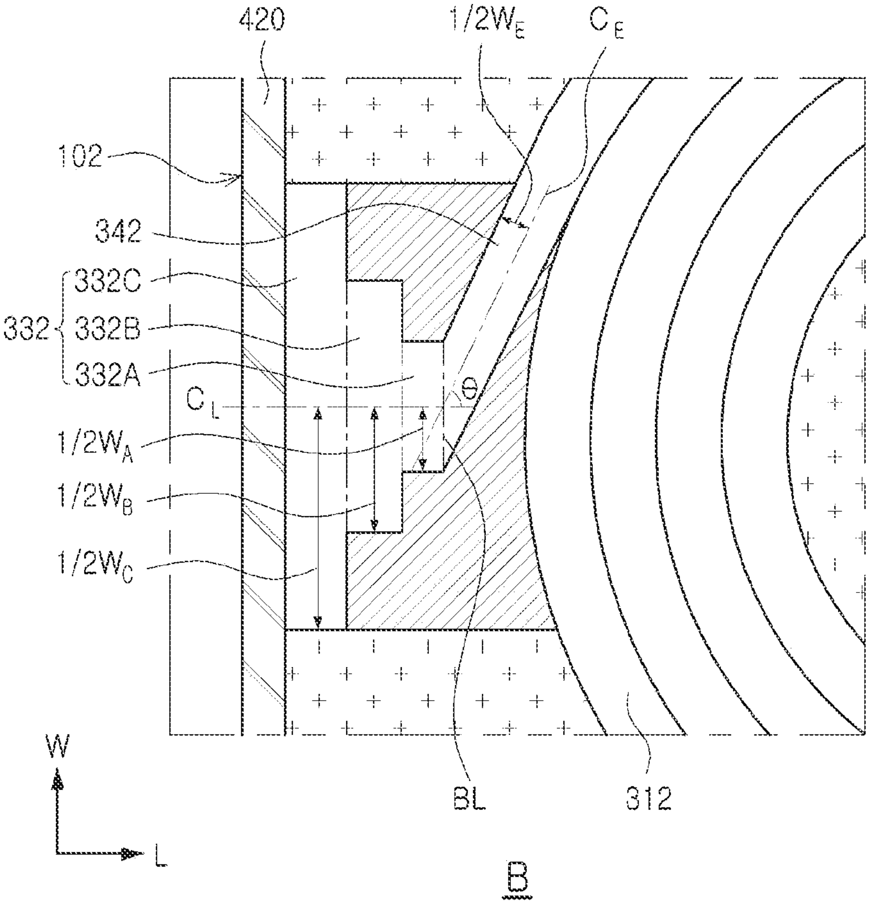
FIG. 7 is an enlarged view of the region B of FIG. 5, illustrating an angle formed by a central line of the extension pattern and a central line of the lead pattern.

FIG. 5 is a plan view illustrating a coil component according to another exemplary embodiment in the present disclosure. FIG. 6 is an enlarged view of a region B of FIG. 5, illustrating a width of each of an extension pattern and a lead pattern. FIG. 7 is an enlarged view of the region B of FIG. 5, illustrating an angle formed by a central line of the extension pattern and a central line of the lead pattern.

Figure 8:
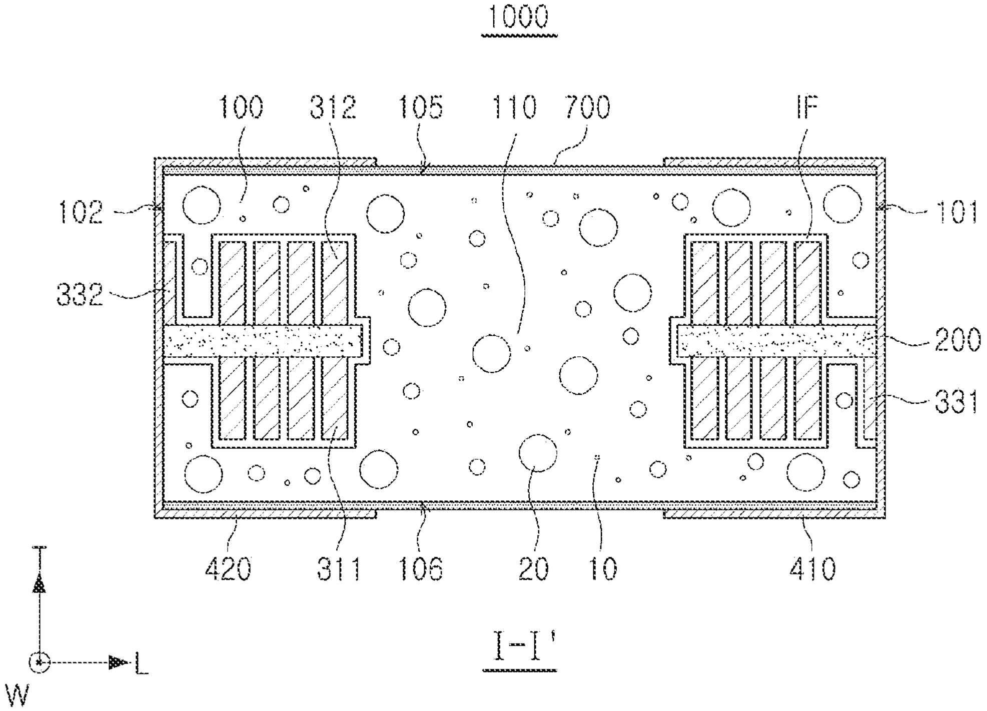
FIG. 8 is a cross-sectional view taken along line I-I' of FIG. 1.
Figure 9:
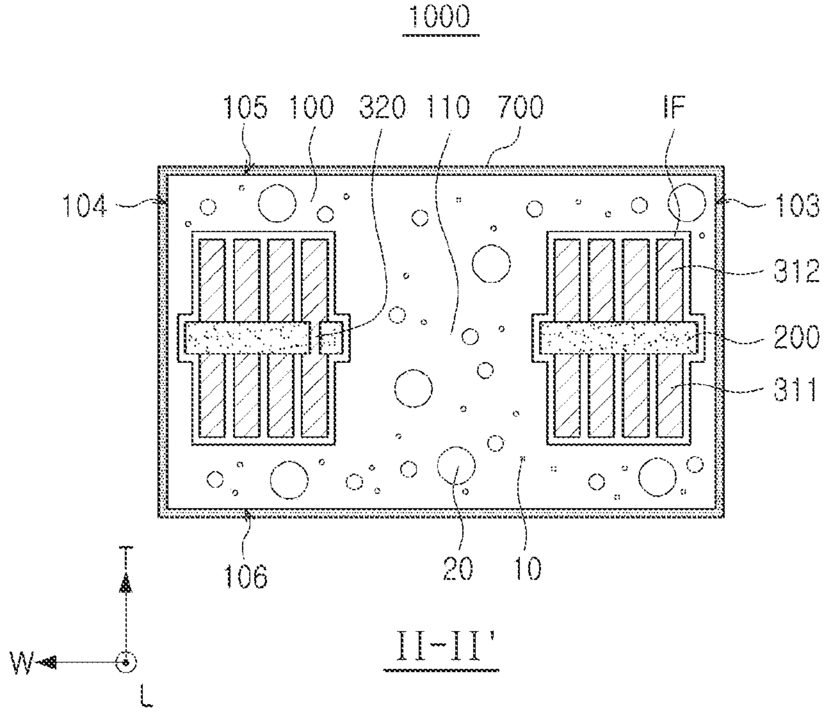
FIG. 9 is a cross-sectional view taken along line II-II' of FIG. 1.

FIG. 8 is a cross-sectional view taken along line I-I' of FIG. 1. FIG. 9 is a cross-sectional view taken along line II-II' of FIG. 1.

Referring to FIGS. 1 through 9, a coil component 1000 according to an exemplary embodiment in the present disclosure may include a body 100, a support substrate 200, a coil portion 300, and external electrodes 410 and 420, and may further include an insulating film IF and/or a surface insulating layer 700.

The body 100 may form an appearance of the coil component 1000 according to the present exemplary embodiment, and the coil portion 300 and the support substrate 200 are disposed in the body 100.

The body 100 may generally have a hexahedral shape.

The body 100 may have a first surface 101 and a second surface 102 opposing each other in the length direction L, a third surface 103 and a fourth surface 104 opposing each other in the width direction W, and a fifth surface 105 and a sixth surface 106 opposing each other in the thickness direction T. The first to fourth surfaces 101 to 104 of the body 100 may correspond to walls of the body 100 connecting the fifth and sixth surfaces 105 and 106 of the body 100 to each other. Hereinafter, opposite end surfaces (one end surface and the other end surface) of the body 100 may refer to the first and second surfaces 101 and 102 of the body 100, opposite side surfaces (one side surface and the other side surface) of the body 100 may refer to the third and fourth surfaces 103 and 104 of the body 100, and one surface and the other surface of the body 100 may refer to the fifth and sixth surfaces 105 and 106 of the body 100, respectively.

The body 100 may be formed so that the coil component 1000 according to the present exemplary embodiment in which the external electrodes 410 and 420 and the surface insulating layer 700 to be described below are formed may have a length of 2.0 mm, a width of 1.2 mm, and a thickness of 0.65 mm by way of example, but is not limited thereto. Meanwhile, the above-described numerical values are merely values assumed in design, which do not reflect a machining error or the like. Therefore, it should be understood that an allowable machining error range also falls within the scope of the present disclosure.

The length of the coil component 1000 described above may refer to the largest of lengths of a plurality of segments that connect the outermost boundary lines of the coil component 1000 and are parallel to the length direction L, in an image of a cross-section of a central portion of the coil component 1000 in the width direction W, the image being taken by an optical microscope or a scanning electron microscope (SEM), and the cross-section being taken along the length direction L and the thickness direction T. Alternatively, the length of the coil component 1000 described above may refer to an arithmetic mean of lengths of at least three of the plurality of segments that connect the outermost boundary lines of the coil component 1000 and are parallel to the length direction L in the image of the cross-section.

The thickness of the coil component 1000 described above may refer to the largest of lengths of a plurality of segments that connect the outermost boundary lines of the coil component 1000 and are parallel to the thickness direction T, in the image of the cross-section of the central portion of the coil component 1000 in the width direction W, the image being taken by an optical microscope or an SEM, and the cross-section being taken along the length direction L and the thickness direction T. Alternatively, the thickness of the coil component 1000 described above may refer to an arithmetic mean of lengths of at least three of the plurality of segments that connect the outermost boundary lines of the coil component 1000 and are parallel to the thickness direction T in the image of the cross-section.

The width of the coil component 1000 described above may refer to the largest of lengths of a plurality of segments that connect the outermost boundary lines of the coil component 1000 and are parallel to the width direction W, in an image of a cross-section of a central portion of the coil component 1000 in the thickness direction T, the image being taken by an optical microscope or an SEM, and the cross-section being taken along the length direction L and the width direction W. Alternatively, the width of the coil component 1000 described above may refer to an arithmetic mean of lengths of at least three of the plurality of segments that connect the outermost boundary lines of the coil component 1000 and are parallel to the width direction W in the image of the cross-section.

Alternatively, each of the length, the width, and the thickness of the coil component 1000 may be measured by a micrometer measurement method. According to the micrometer measurement method, measurement may be performed by zeroing a micrometer subjected to gage repeatability and reproducibility (R&R), inserting the coil component 1000 according to the present exemplary embodiment between tips of the micrometer, and turning a measurement lever of the micrometer. Meanwhile, when measuring the length of the coil component 1000 by the micrometer measurement method, the length of the coil component 1000 may refer to a value obtained by performing the measurement once, or an arithmetic mean of values obtained by performing the measurement multiple times. The same may apply to the width and the thickness of the coil component 1000.

The body 100 may contain an insulating resin 10 and a magnetic material 20. Specifically, the body 100 may be formed by stacking one or more magnetic composite sheets in which the magnetic material is dispersed in the insulating resin 10. The magnetic material 20 may be ferrite or metal magnetic powder particle.

The ferrite may be, for example, at least one of spinel type ferrites such as Mg—Zn-based ferrite, Mn—Zn-based ferrite, Mn—Mg-based ferrite, Cu—Zn-based ferrite, Mg—Mn—Sr-based ferrite, or Ni—Zn-based ferrite, hexagonal ferrites such as Ba—Zn-based ferrite, Ba—Mg-based ferrite, Ba—Ni-based ferrite, Ba—Co-based ferrite, or Ba—Ni—Co-based ferrite, garnet type ferrite such as Y-based ferrite, or Li-based ferrite.

The metal magnetic powder particle may include one or more selected from the group consisting of iron (Fe), silicon (Si), chromium (Cr), cobalt (Co), molybdenum (Mo), aluminum (Al), niobium (Nb), copper (Cu), and nickel (Ni).

For example, the metal magnetic powder particle may be at least one of a pure iron powder particle, an Fe—Si-based alloy powder particle, an Fe—Si—Al-based alloy powder particle, an Fe—Ni-based alloy powder particle, an Fe—Ni—Mo-based alloy powder particle, Fe—Ni—Mo—Cu-based alloy powder particle, an Fe—Co-based alloy powder particle, an Fe—Ni—Co-based alloy powder particle, an Fe—Cr-based alloy powder particle, an Fe—Cr—Si-based alloy powder particle, Fe—Si—Cu—Nb-based alloy powder particle, an Fe—Ni—Cr-based alloy powder particle, or an Fe—Cr—Al-based alloy powder particle.

The metal magnetic powder particle may be amorphous or crystalline. For example, the metal magnetic powder particle may be an Fe—Si—B—Cr based amorphous alloy powder particle, but is not necessarily limited thereto.

The ferrite and the metal magnetic powder particles may have average diameters of about 0.1 μm to 30 μm, respectively, but are not limited thereto.

The body 100 may include two or more kinds of magnetic materials dispersed in a resin. Here, different kinds of magnetic materials mean that magnetic materials dispersed in a resin are distinguishable from each other by any one of an average diameter, a composition, crystallinity, and a shape.

Hereinafter, it is assumed that the magnetic material is the metal magnetic powder particle 20. However, the scope of the present disclosure is not limited by the body 100 having a structure in which the metal magnetic powder particle 20 is disposed in the insulating resin 10.

The insulating resin 10 may include epoxy, polyimide, liquid crystal polymer (LCP), or the like, or mixtures thereof, but is not limited thereto.

The body 100 includes a core 110 penetrating through the support substrate 200 and the coil portion 300 to be described below. The core 110 may be formed by filling a through-hole penetrating through a central portion of each of the coil portion 300 and the support substrate 200 with the magnetic composite sheet, but is not limited thereto.

The support substrate 200 is embedded in the body 100. The support substrate 200 is a component supporting the coil portion 300 to be described below.

The support substrate 200 may be formed of an insulating material including a thermosetting resin such as an epoxy resin, a thermoplastic resin such as a polyimide resin, or a photosensitive insulating resin or be formed of an insulating material having a reinforcement material such as a glass fiber or an inorganic filler impregnated in such an insulating resin. As an example, the support substrate 200 may be formed of an insulating material such as prepreg, an Ajinomoto Build-up Film (ABF), FR-4, a Bismaleimide Triazine (BT) resin, a photoimagable dielectric (PID), or the like, but is not limited thereto.

As the inorganic filler, at least one selected from the group consisting of silica ($SiO_2$), alumina ($Al_2O_3$), silicon carbide (SiC), barium sulfate ($BaSO_4$), talc, clay, mica powder particles, aluminum hydroxide ($Al(OH)_3$), magnesium hydroxide ($Mg(OH)_2$), calcium carbonate ($CaCO_3$), magnesium carbonate ($MgCO_3$), magnesium oxide (MgO), boron nitride (BN), aluminum borate ($AlBO_3$), barium titanate ($BaTiO_3$), and calcium zirconate ($CaZrO_3$) may be used.

When the support substrate 200 is formed of the insulating material including the reinforcement material, the support substrate 200 may provide more excellent rigidity. When the support substrate 200 is formed of an insulating material that does not include a glass fiber, the support substrate 200 may be advantageous in decreasing the thickness of the coil component 1000 according to the present exemplary embodiment. In addition, a volume occupied by the coil portion 300 and/or the metal magnetic powder particle 20 with respect to the body 100 having the same size may be increased, and thus a component characteristic may be improved. When the support substrate 200 is formed of the insulating material including the photosensitive insulating resin, the number of processes for forming the coil portion 300 may be decreased, advantageous in decreasing production costs, and a fine via may be formed.

The coil portion 300 may be disposed in the body 100, and may implement characteristics of the coil component. For example, when the coil component 1000 according to the present exemplary embodiment is used as a power inductor, the coil portion 300 may serve to store an electrical field as a magnetic field to maintain an output voltage, thereby stabilizing power of an electronic device.

The coil portion 300 includes coil patterns 311 and 312, a via 320, lead patterns 331 and 332, and extension patterns 341 and 342.

Specifically, based on the directions in FIGS. 1 through 9, the first coil pattern 311, the first lead pattern 331, and the first extension pattern 341 are disposed on a lower surface of the support substrate 200, and the second coil pattern 312, the second lead pattern 332, and the second extension pattern 342 are disposed on an upper surface of the support substrate 200, the lower surface opposing the sixth surface 106 of the body 100, and the upper surface opposing the lower surface of the support substrate 200.

The via 320 penetrates through the support substrate 200 and contacts an inner end portion of each of the first coil pattern 311 and the second coil pattern 312.

The first extension pattern 341 is disposed between the first coil pattern 311 and the first lead pattern 331 and connects the first coil pattern 311 and the first lead pattern 331 to each other, and the second extension pattern 342 is disposed between the second coil pattern 312 and the second lead pattern 332 and connects the second coil pattern 312 and the second lead pattern 332 to each other. The first and second extension patterns 341 and 342 may each have a substantially straight line shape with a substantially uniform width $W_E$. One or ordinary skill in the art would understand that the expression "substantially uniform" refers to being uniform or the same by allowing process errors, positional deviations, and/or measurement errors that may occur in a manufacturing process.

The first and second lead patterns 331 and 332 are connected to the first and second extension patterns 341 and 342, exposed at the first and second surfaces 101 and 102 of the body 100, and connected to the first and second external electrodes 410 and 420 to be described below, respectively. Therefore, the coil portion 300 may function as a single coil as a whole between the first and second external electrodes 410 and 420.

Each of the first coil pattern 311 and the second coil pattern 312 may have a planar spiral shape forming at least one turn around the core 110. As an example, the first coil pattern 311 may format least one turn around the core 110 on the lower surface of the support substrate 200.

The lead patterns 331 and 332 are exposed at the first and second surfaces 101 and 102 of the body 100, respectively.

Specifically, the first lead pattern 331 is exposed at the first surface 101 of the body 100, and the second lead pattern 332 is exposed at the second surface 102 of the body 100.

Referring to FIGS. 2 through 7, the lead pattern 332 may have an inner portion 332A adjacent to the extension pattern 342, an outer portion 332C adjacent to the external electrode 420, and a middle portion 332B disposed between the inner portion 332A and the outer portion 332C.

Specifically, the first lead pattern 331 may have a first inner portion 331A adjacent to the first extension pattern 341, a first outer portion 331C adjacent to the first external electrode 410, and a middle portion 331B disposed between the first inner portion 331A and the first outer portion 331C. Further, the second lead pattern 332 may have the second inner portion 332A adjacent to the second extension pattern 342, the second outer portion 332C adjacent to the second external electrode 420, and the second middle portion 332B disposed between the second inner portion 332A and the second outer portion 332C.

Here, a width of the lead pattern 332 may be increased from the inner portion 332A toward the outer portion 332C. Specifically, a width $W_B$ of the middle portion 332B may be larger than a width $W_A$ of the inner portion 332A, and smaller than a width $W_C$ of the outer portion 332C.

According to the exemplary embodiment in the present disclosure, referring to FIGS. 2 through 4, the extension pattern 342 has a substantially uniform width $W_E$, whereas, the lead pattern 332 may have different widths ($W_A$, $W_B$, and $W_C$) depending on positions, and the width of the lead pattern 332 may be continuously increased from the inner portion 332A toward the outer portion 332C. That is, the lead pattern 332 may have a structure whose overall shape is a radial shape.

Referring to FIG. 4, the extension pattern 342 and the lead pattern 332 may be divided based on a virtual boundary line BL. In the lead pattern 332, a region adjacent to the virtual boundary line BL may be the inner portion 332A, a region adjacent to the external electrode 420 may be the outer portion 332C, and a region between the inner portion 332A and the outer portion 332C may be the middle portion 332B.

The extension pattern 342 may be formed so that a virtual central line $C_E$ connecting central points of the width $W_E$ obliquely meets a virtual central line $C_L$ connecting central points of the widths $W_A$, $W_B$, and $W_C$. In other words, both central lines $C_E$ and $C_L$ may meet in an oblique direction while maintaining a specific angle (θ), rather than being parallel to each other or being perpendicular to each other.

Further, among opposite side surfaces defining the width $W_E$ of the extension pattern 342, a side surface adjacent to the coil pattern 312 may be substantially coplanar with a side surface of the lead pattern 332 that is adjacent to the coil pattern 312 among opposite side surfaces defining the widths $W_A$, $W_B$, and $W_C$ of the lead pattern 332. One or ordinary skill in the art would understand that the expression "substantially the same" refers to lying on the same plane by allowing process errors, positional deviations, and/or measurement errors that may occur in a manufacturing process.

That is, in this case, the side surfaces of the extension pattern 342 and the lead patterns 332 that are adjacent to the coil pattern 312 may be disposed in a substantially straight line shape in the plan views as in FIGS. 2 through 4.

On the other hand, among opposite side surfaces defining the widths $W_A$, $W_B$, and $W_C$ of the lead pattern 332, another side surface of the lead pattern 332 that is adjacent to the external electrode 420 may obliquely meet an inner surface of the external electrode 420.

Referring to FIG. 3, the other side surface of the lead pattern 332, opposing, but not parallel with, the side surface of the lead pattern 332 adjacent to the coil pattern 312, may obliquely meet the inner surface of the external electrode 420.

In this embodiment, an acute angle between one side surface of the lead pattern 332 and the inner surface of the external electrode 420 may be larger than an acute angle between the other side surface of the lead pattern 332 and the inner surface of the external electrode 420.

According to another exemplary embodiment in the present disclosure, referring to FIGS. 5 through 7, a lead pattern 332 may have different widths ($W_A$, $W_B$, and $W_C$) depending on positions, and the width of the lead pattern 332 may be continuously increased from an inner portion 332A toward a middle portion 332B and an outer portion 332C.

However, unlike the radial structure in the above-described exemplary embodiment, in the present exemplary embodiment, the respective widths $W_A$, $W_B$, and $W_C$ of the inner portion 332A, the middle portion 332B, and the outer portion 332C are substantially uniform. That is, the lead pattern 332 may have a structure whose overall shape is a step shape.

Referring to FIG. 7, an extension pattern 342 and the lead pattern 332 may be divided based on a virtual boundary line BL. In the lead pattern 332, a region adjacent to the virtual boundary line BL may be the inner portion 332A, a region adjacent to the external electrode 420 may be the outer portion 332C, and a region between the inner portion 332A and the outer portion 332C may be the middle portion 332B.

The extension pattern 342 may be formed so that a virtual central line $C_E$ connecting central points of the width $W_E$ obliquely meets a virtual central line $C_L$ connecting central points of the widths $W_A$, $W_B$, and $W_C$. In other words, both central lines $C_E$ and $C_L$ may meet in an oblique direction while maintaining a specific angle (θ), rather than being parallel to each other or being perpendicular to each other.

Referring to FIGS. 1 through 7, the extension pattern 342 may extend from one end of the coil pattern 312 in an oblique direction (e.g., parallel to virtual central lines $C_E$ in FIGS. 4 and 7) with respect to an external surface of the body on which the external electrode 420 is disposed. In one example, the extension pattern 342 may include a portion substantially straight. One or ordinary skill in the art would understand that the expression "substantially straight" refers to being straight by allowing process errors, positional deviations, and/or measurement errors that may occur in a manufacturing process.

At least one of the coil patterns 311 and 312, the via 320, the lead patterns 331 and 332, and the extension patterns 341 and 342 may include at least one conductive layer.

As an example, in a case where the second coil pattern 312, the via 320, the second lead pattern 332, and the second extension pattern 342 are formed on the upper surface of the support substrate 200 by plating, each of the second coil pattern 312, the via 320, the second lead pattern 332, and the second extension pattern 342 may include a seed layer and an electroplating layer. Here, the electroplating layer may have a single-layer structure or have a multilayer structure. The electroplating layer having the multilayer structure may be formed in a conformal film structure in which one electroplating layer is formed along a surface of another electroplating layer, or may be formed in a shape in which one electroplating layer is stacked on only one surface of another electroplating layer. The seed layer may be formed by an electroless plating method or a vapor deposition method such as sputtering. The respective seed layers of the second coil pattern 312, the via 320, the second lead pattern 332, and the second extension pattern 342 may be formed integrally with each other, such that a boundary is not formed therebetween. However, the seed layers are not limited thereto. The respective electroplating layers of the second coil pattern 312, the via 320, the second lead pattern 332, and the second extension pattern 342 may be formed integrally with each other, such that a boundary is not formed therebetween. However, the seed layers are not limited thereto.

As another example, in a case where the first coil pattern 311, the first lead pattern 331, and the first extension pattern 341 disposed on the lower surface of the support substrate 200, and the second coil pattern 312, the second lead pattern 332, and the second extension pattern 342 disposed on the upper surface of the support substrate 200 are formed separately, and collectively stacked on the support substrate 200 to form the coil portion 300, the via 320 may include a high-melting-point metal layer, and a low-melting-point metal layer having a melting point lower than that of the high-melting-point metal layer. Here, the low-melting-point metal layer may be formed of a solder including lead (Pb) and/or tin (Sn). At least a portion of the low-melting-point metal layer may be melted due to a pressure and a temperature at the time of the collective stacking, such that an inter-metallic compound (IMC) layer may be formed on a boundary between the low-melting-point metal layer and the second coil pattern 312 by way of example.

The coil pattern 311, the lead pattern 331, and the extension pattern 341 may protrude from the lower surface of the support substrate 200, and the coil pattern 312, the lead pattern 332, and the extension pattern 342 may protrude from the upper surface of the support substrate 200 as illustrated in FIGS. 8 and 9 by way of example. As another example, the first coil pattern 311, the first lead pattern 331, and the first extension pattern 341 may protrude from the lower surface of the support substrate 200, and the second coil pattern 312, the second lead pattern 332, and the second extension pattern 342 may be embedded in the upper surface of the support substrate 200 and upper surfaces of the second coil pattern 312, the second lead pattern 332, and the second extension pattern 342 may be exposed at the upper surface of the support substrate 200. In this case, a concave portion is formed in each of the upper surface of the second coil pattern 312, the upper surface of the second lead pattern 332, and/or the upper surface of the second extension pattern 342, such that the upper surface of the support substrate 200 does not have to be substantially coplanar with the upper surface of the second coil pattern 312, the upper surface of the second lead pattern 332, and/or the upper surface of the second extension pattern 342.

Each of the coil patterns 311 and 312, the via 320, the lead patterns 331 and 332, and the extension patterns 341 and 342 may be formed of a conductive material such as copper (Cu), aluminum (Al), silver (Ag), tin (Sn), gold (Au), nickel (Ni), lead (Pb), titanium (Ti), chromium (Cr), or alloys thereof, but is not limited thereto.

The external electrodes 410 and 420 are disposed on the body 100 so as to be spaced apart from each other, and are connected to the coil portion 300. Specifically, the first external electrode 410 may be disposed on the first surface 101 of the body 100 and contact the first lead pattern 331 exposed at the first surface 101 of the body 100. Further, the second external electrode 420 may be disposed on the second surface 102 of the body 100 and contact the second lead pattern 332 exposed at the second surface 102 of the body 100.

The external electrodes 410 and 420 may be formed by a vapor deposition method such as sputtering, and/or a plating method, but are not limited thereto.

The external electrodes 410 and 420 may be formed of a conductive material such as copper (Cu), aluminum (Al), silver (Ag), tin (Sn), gold (Au), nickel (Ni), lead (Pb), chromium (Cr), titanium (Ti), or alloys thereof, but are not limited thereto. The external electrodes 410 and 420 may each have a single-layer structure or have a multilayer structure. As an example, the first external electrode 410 may include a first conductive layer containing silver (Ag) and copper (Cu), a second conductive layer disposed on the first conductive layer and containing nickel (Ni), and a third conductive layer disposed on the second conductive layer and containing tin (Sn). At least one of the second conductive layer or the third conductive layer may be formed so as to cover the first conductive layer, but the scope of the present disclosure is not limited thereto. At least one of the second conductive layer or the third conductive layer may be disposed only on the sixth surface 106 of the body 100, but the scope of the present disclosure is not limited thereto. The first conductive layer may be a plating layer or a conductive resin layer formed by applying and curing a conductive resin containing conductive powder particle including at least one of copper (Cu) or silver (Ag), and a resin. The second and third conductive layers may be plating layers, but the scope of the present disclosure is not limited thereto.

The insulating film IF is disposed between the coil portion 300 and the body 100, and between the support substrate 200 and the body 100. The insulating film IF may be formed along the surface of the support substrate 200 on which the coil patterns 311 and 312, the lead patterns 331 and 332, and the extension patterns 341 and 342 are formed, but is not limited thereto.

The insulating film IF may be provided in order to insulate the coil portion 300 and the body 100, and may contain any known insulating material such as parylene, but is not limited thereto. As another example, the insulating film IF may contain an insulating material such as an epoxy resin, other than parylene.

The insulating film IF may be formed by a vapor deposition method, but is not limited thereto. As another example, the insulating film IF may be formed by stacking an insulation film for forming the insulating film IF on opposite surfaces of the support substrate 200 on which the coil portion 300 is formed and then curing the insulating film. Alternatively, the insulating film IF may be formed by applying an insulating paste for forming the insulating film IF on opposite surfaces of the support substrate 200 on which the coil portion 300 is formed and then curing the insulating paste.

Meanwhile, the insulating film IF is a component that may be omitted in the present exemplary embodiment. That is, in a case where the body 100 has a sufficient electrical resistance at a designed operating current and voltage of the coil component 1000 according to the present exemplary embodiment, the insulating film IF may be omitted in the present exemplary embodiment.

The coil component 1000 according to the present exemplary embodiment may further include a surface insulating layer 700 disposed on the fifth surface 105 of the body 100 and covering the body 100 to protect the body 100 from the outside.

The surface insulating layer 700 may extend from the fifth surface 105 of the body 100 to at least portions of the first to fourth surfaces 101 to 104, and the sixth surface 106. In the present exemplary embodiment, the surface insulating layer 700 may be disposed on each of the third to sixth surfaces 103 to 106 of the body 100.

At least portions of the surface insulating layer 700 that are disposed on the third to sixth surfaces 103 to 106 of the body 100, respectively, may be formed in the same process and may be formed integrally with each other, such that a boundary is not formed therebetween. However, the scope of the present disclosure is not limited thereto.

The surface insulating layer 700 may contain a thermoplastic resin such as polystyrenes, vinyl acetates, polyesters, polyethylenes, polypropylenes, polyamides, rubbers, or acryls, a thermosetting resin such as phenols, epoxies, urethanes, melamines, or alkyds, a photosensitive resin, parylene, $SiO_x$, or $SiN_x$. The surface insulating layer 700 may further contain an insulating filler such as an inorganic filler, but is not limited thereto.

Figure 10:
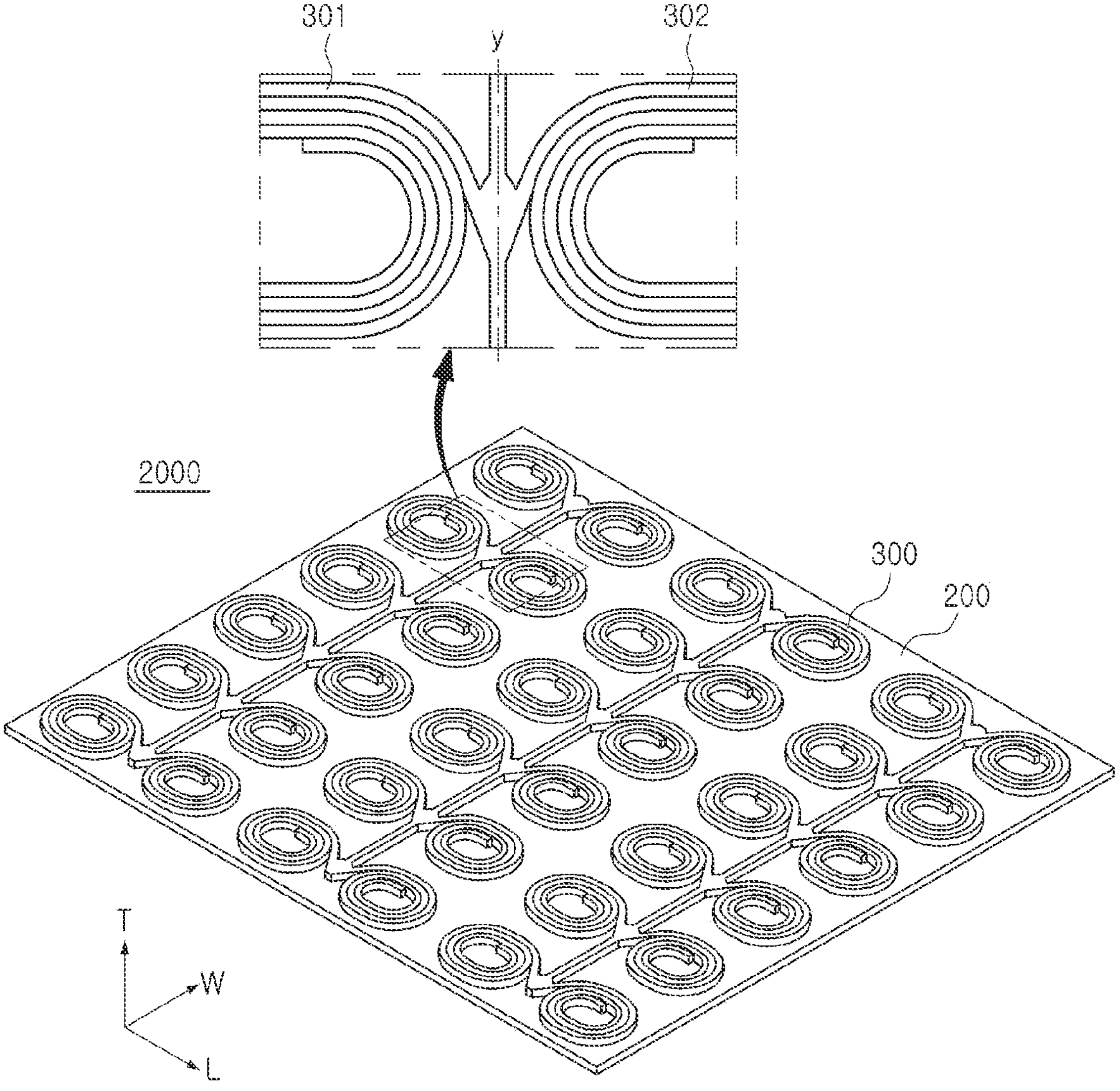
FIG. 10 is a view illustrating a coil bar for manufacturing the coil component according to an exemplary embodiment in the present disclosure.

FIG. 10 is a view illustrating a coil bar 2000 for manufacturing the coil component 1000 according to an exemplary embodiment in the present disclosure.

Referring to FIG. 10, the coil component 1000 may be produced with the coil bar 2000 forming a plurality of coil portions 300 on the support substrate 200 by stacking a magnetic composite sheet and performing dicing.

In the present exemplary embodiment, left and right coil portions 301 and 302 may be mirror-symmetric to each other in relation to a bar to which the plurality of coil portions 300 are connected. That is, in a plane of which an x axis is the length direction (L direction) and a y axis is the width direction (W direction), the left and right coil portions 301 and 302 may be symmetric to each other with respect to the y axis.

In this case, the left coil portion 301 may form a turn in a counterclockwise direction from an outer side of the coil portion 300 toward the center, and the right coil portion 302 may form a turn in a clockwise direction. That is, the left and right coil portions 301 and 302 may form turns in opposite directions, respectively.

Figure 11:
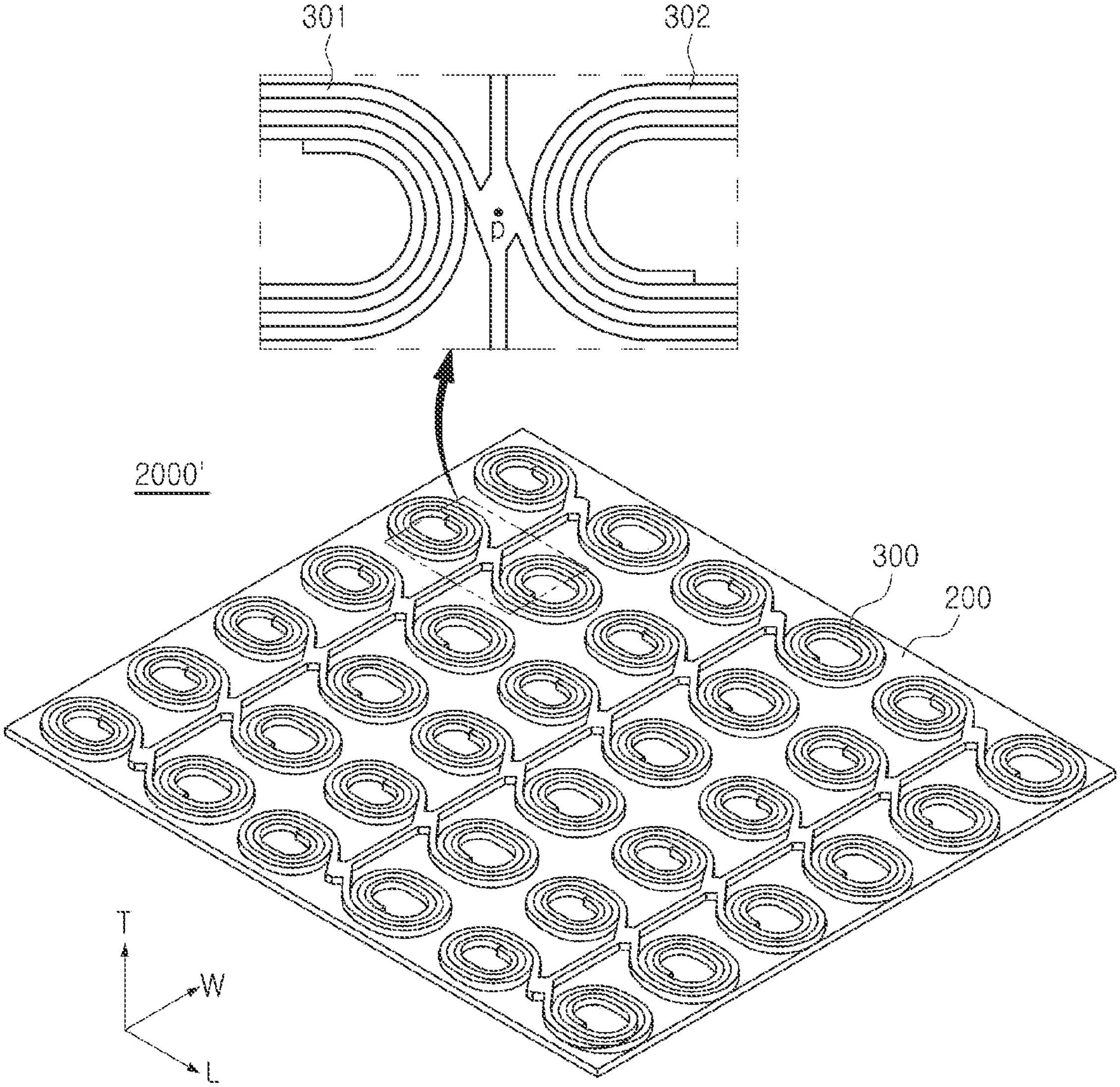
FIG. 11 is a view illustrating a coil bar for manufacturing the coil component according to another exemplary embodiment in the present disclosure.

FIG. 11 is a view illustrating a coil bar 2000' for manufacturing the coil component 1000 according to another exemplary embodiment in the present disclosure.

Referring to FIG. 11, the coil component 1000 may be produced with the coil bar 2000' forming a plurality of coil portions 300 on the support substrate 200 by stacking a magnetic composite sheet and performing dicing.

In the present exemplary embodiment, left and right coil portions 301 and 302 may be origin-symmetric to each other in relation to a bar to which the plurality of coil portions 300 are connected. That is, in a plane of which an x axis is the length direction (L direction) and a y axis is the width direction (W direction), the left and right coil portions 301 and 302 may be origin-symmetric to each other with respect to a central point p where lead patterns of the left and right coil portions 301 and 302 meet each other.

In this case, the left coil portion 301 may form a turn in a counterclockwise direction from an outer side of the coil portion 300 toward the center, and the right coil portion 302 may similarly form a turn in the counterclockwise direction. That is, the left and right coil portions 301 and 302 may form turns in the same direction, respectively.

According to the present disclosure, the lead pattern 332 may have a radial structure or a stepped structure as described above. As a result, in comparison to a general horizontal structure according to the related art, a portion of the lead pattern 332 that contacts the external electrode 420 has a larger size, and thus a favorable direct-current resistance (Rdc) characteristic and current characteristic may be maintained. In addition, a larger space for the magnetic powder particle 10 may be secured in the body 100 due to a smaller volume of the lead pattern 332, therefore, inductance (Ls) characteristics may be improved.

Further, an electrode loss that may occur at the time of performing dicing in a process of using the coil bar 2000 when manufacturing the coil component 1000 may be reduced.

As set forth above, according to the exemplary embodiment in the present disclosure, the coil component, in which the portion of the lead pattern of the coil component has a large size to improve inductance (Ls) characteristics and current characteristics, may be provided, the portion being coupled to an external electrode.

While exemplary embodiments have been shown and described above, it will be apparent to those skilled in the art that modifications and variations could be made without departing from the scope of the present disclosure as defined by the appended claims.

What is claimed is:

1. A coil component comprising:

a body;

a support substrate disposed in the body;

a coil portion including coil patterns, lead patterns, and extension patterns and disposed on the support substrate, the lead patterns being exposed to outside of the body, the extension patterns connecting the coil patterns to the lead patterns; and external electrodes disposed on the body and contacting the lead patterns, wherein each of the lead patterns has an inner portion adjacent to one of the extension patterns, an outer portion adjacent to one of the external electrodes, and a middle portion disposed between the inner portion and the outer portion, a width of the middle portion is larger than a width of the inner portion and smaller than a width of the outer portion, and in a cross-section perpendicular to a winding axis of the coil patterns, each of the lead patterns is wedge-shaped with sharp ends at the corresponding outer portion, and inner angles defined at the sharp ends of each lead pattern are acute angles that face each other.

2. The coil component of claim 1, wherein a width of each lead pattern continuously increases from a surface contacting one of the extension patterns toward a surface contacting one of the external electrodes.

3. The coil component of claim 1, wherein a virtual central line connecting central points of a width of one of the extension patterns obliquely meets a virtual central line connecting central points of widths of one of the lead patterns.

4. The coil component of claim 1, wherein the width of each of the inner portion, the middle portion, and the outer portion is substantially uniform.

5. The coil component of claim 1, wherein among side surfaces of one of the extension patterns, a side surface adjacent to one of the coil patterns is substantially coplanar with a side surface of one of the lead patterns that is adjacent to one of the coil patterns among side surfaces of one of the lead patterns.

6. The coil component of claim 1, wherein the coil patterns include a first coil pattern disposed on a first surface of the support substrate, and a second coil pattern disposed on a second surface of the support substrate opposing the first surface of the support substrate, the lead patterns include a first lead pattern disposed on the first surface of the support substrate and a second lead pattern disposed on the second surface of the support substrate, the extension patterns include a first extension pattern disposed on the first surface of the support substrate and connecting the first coil pattern and the first lead pattern to each other, and a second extension pattern disposed on the second surface of the support substrate and connecting the second coil pattern and the second lead pattern to each other, and the external electrodes include a first external electrode disposed on a first end surface of the body and contacting the first lead pattern, and a second external electrode disposed on a second end surface of the body and contacting the second lead pattern.

7. The coil component of claim 1, wherein the first lead pattern has a first inner portion adjacent to the first extension pattern, a first outer portion adjacent to the first external electrode, and a first middle portion disposed between the first inner portion and the first outer portion, the second lead pattern has a second inner portion adjacent to the second extension pattern, a second outer portion adjacent to the second external electrode, and a second middle portion disposed between the second inner portion and the second outer portion, a width of the first middle portion is larger than a width of the first inner portion and smaller than a width of the first outer portion, and a width of the second middle portion is larger than a width of the second inner portion and smaller than a width of the second outer portion.

8. The coil component of claim 7, wherein the coil portion further includes a via penetrating through the support substrate and connecting the first coil pattern and the second coil pattern to each other.

9. The coil component of claim 1, wherein the body contains an insulating resin and a magnetic powder particle.

10. A coil component comprising:

a body;

a support substrate disposed in the body;

a coil portion having a through-hole penetrating through a central portion of the coil portion and including a first coil pattern, a first lead pattern, and a first extension pattern, each disposed on a first surface of the support substrate, the first coil pattern winding around the through-hole, the first lead pattern being exposed to outside of the body, the first extension pattern connecting the first coil pattern to the first lead pattern; and a first external electrode disposed on the body and contacting the first lead pattern, wherein a first side surface of the first lead pattern obliquely meets an inner surface of the first external electrode, and a second side surface of the first lead pattern, opposing, but not parallel with, the first side surface of the first lead pattern, obliquely meets the inner surface of the first external electrode, and an acute angle defined by the first side surface of the first lead pattern and the inner surface of the first external electrode and an acute angle defined by the second side surface of the first lead pattern and the inner surface of the first external electrode face each other.

11. The coil component of claim 10, wherein the acute angle defined by the first side surface of the first lead pattern and the inner surface of the first external electrode is different from the acute angle defined by the second side surface of the first lead pattern and the inner surface of the first external electrode.

12. The coil component of claim 10, wherein the first extension pattern has first and second side surfaces opposing each other, and the first side surface of the first extension pattern is angled with the first side surface of the first lead pattern, and the second side surface of the first extension pattern is substantially coplanar with the second side surface of the first lead pattern.

13. The coil component of claim 12, wherein an acute angle between the first side surface of the first lead pattern and the inner surface of the first external electrode is larger than an acute angle between the second side surface of the first lead pattern and the inner surface of the first external electrode.

14. The coil component of claim 10, wherein the first lead pattern has a first inner portion contacting the first extension pattern, a first outer portion contacting the first external electrode, and a first middle portion disposed between the first inner portion and the first outer portion, and a width of the first middle portion is larger than a width of the first inner portion and smaller than a width of the first outer portion.

15. The coil component of claim 10, further comprising a second external electrode disposed on the body, in opposite to the first external electrode, wherein the coil portion further includes a second coil pattern, a second extension pattern, and a second lead pattern, each disposed on a second surface of the support substrate opposing the first surface of the support substrate, and the second lead pattern is connected to the second external electrode.

16. The coil component of claim 15, wherein the first coil pattern, the first extension pattern, and the first lead pattern are origin-symmetric to the second coil pattern, the second extension pattern, and the second lead pattern, respectively, with respect to a center point of the coil portion.

17. A coil component comprising:

a body;

a support substrate disposed in the body;

a coil portion having a through-hole penetrating through a central portion of the coil portion and including a coil pattern, a lead pattern, and an extension pattern, each disposed on the support substrate, the coil pattern winding around the through-hole, the lead pattern being exposed to outside of the body, the extension pattern connecting the coil pattern to the lead pattern;

an external electrode disposed on the body and contacting the lead pattern; and an insulating film covering the coil portion and a surface of the support substrate, wherein the extension pattern extends from one end of the coil pattern in an oblique direction with respect to an external surface of the body on which the external electrode is disposed, the extension pattern includes a portion substantially straight, the coil component further comprises a surface insulating layer disposed on the body, at least a portion of the surface insulating layer extending between the body and each of the external electrodes, and on a cross-sectional view taken at a center portion of the body, a portion of the insulating film covering the coil pattern and a portion covering the lead pattern are directly connected to each other on the support substrate.

18. The coil component of claim 17, wherein a width of the lead pattern continuously increases from a surface contacting the extension pattern toward a surface contacting the external electrode.

19. The coil component of claim 17, wherein the lead pattern has an inner portion connected to the extension patterns, an outer portion connected to the external electrode, and a middle portion disposed between the inner portion and the outer portion, and the lead pattern is configured in a step shape such that a width of each of the inner portion, the middle portion, and the outer portion is substantially uniform.

* * * * *